United States Patent
Amirijoo et al.

(10) Patent No.: US 9,241,241 B2
(45) Date of Patent: Jan. 19, 2016

(54) METHODS AND ARRANGEMENTS FOR HANDLING POSITIONING IN A RADIO COMMUNICATION SYSTEM

(75) Inventors: Mehdi Amirijoo, Linköping (SE); Fredrik Gunnarsson, Linköping (SE); Johan Moe, Mantorp (SE); András Rácz, Budapest (HU); Åke Busin, Sollentuna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 205 days.

(21) Appl. No.: 14/003,516

(22) PCT Filed: Mar. 7, 2011

(86) PCT No.: PCT/SE2011/050253
§ 371 (c)(1),
(2), (4) Date: Oct. 7, 2013

(87) PCT Pub. No.: WO2012/121633
PCT Pub. Date: Sep. 13, 2012

(65) Prior Publication Data
US 2014/0018098 A1    Jan. 16, 2014

(51) Int. Cl.
*H04W 24/00* (2009.01)
*H04W 4/02* (2009.01)
(Continued)

(52) U.S. Cl.
CPC ............. *H04W 4/023* (2013.01); *G01S 5/0081* (2013.01); *G01S 5/021* (2013.01); *G01S 5/06* (2013.01); *G01S 5/10* (2013.01); *H04W 64/00* (2013.01)

(58) Field of Classification Search
CPC ..................................................... H04W 24/00
USPC ......................................................... 455/456.1
See application file for complete search history.

(56) References Cited

U.S. PATENT DOCUMENTS 7,215,967 B1    5/2007 Kransmo et al.
8,547,223 B2 * 10/2013 Midtun et al. ........... 340/539.13
(Continued)

OTHER PUBLICATIONS

3GPP, Technical Specification: "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305 V9.2.0 (Mar. 2010), 52 pp.
(Continued)

*Primary Examiner* — Huy C Ho
(74) *Attorney, Agent, or Firm* — Patent Portfolio Builders, PLLC

(57) ABSTRACT

A method in a first radio network node for handling position measurements is provided. The first radio network node receives from a second radio network node a position measurement associated with a user equipment, and a system frame number. The system frame number is associated with the second radio network node. The system frame number is further related to a point in time when the position measurement was performed. The first radio network node calculates a position estimate of the position of the user equipment based on the position measurement. The first radio network node defines a time stamp which is based on the received system frame number. The first radio network node then signals to a third radio network node a positioning response. The positioning response comprises the position estimate and the time stamp.

14 Claims, 6 Drawing Sheets

(51) Int. Cl.
*H04W 64/00* (2009.01)
*G01S 5/00* (2006.01)
*G01S 5/02* (2010.01)
*G01S 5/06* (2006.01)
*G01S 5/10* (2006.01)

(56) References Cited

U.S. PATENT DOCUMENTS

2004/0203717 A1  10/2004  Wingrowicz et al.
2006/0223546 A1*  10/2006  Claussen ............. 455/456.1
2010/0197239 A1   8/2010  Catovic et al.

OTHER PUBLICATIONS

3GPP, Technical Specification: "3rd Generation Partnership Project; Technical Specification Group Radio Access Network; Evolved Universal Terrestrial Radio Access (E-UTRA); LTE Positioning Protocol (LPP) (Release 9)", 3GPP TS 36.355 V9.3.0 (Sep. 2010), 113 pp.
3GPP, Technical Specification: "3rd Generation Partnership Project; Technical Specification Group Core Network and Terminals Location Services (LCS); LCS Application Protocol (LCS-AP) between the Mobile Management Entity (MME) and Evolved Serving Mobile Location Centre (E-SMLC); SLs interface (Release 10)", 3GPP TS 29.171 V10.1.0 (Sep. 2010), 51 pp.
3GPP, Technical Specification: "3rd Generation Partnership Project; Technical Specification Group Radio Access Network; Study on Minimization of drive-tests in Next Generation Networks (Release 9)", 3GPP TS 36.805 V9.0.0 (Dec. 2009), 24 pp.
3GPP, Technical Specification: "3rd Generation Partnership Project; Technical Specification Group Radio Access Network; Evolved Universal Terrestrial Radio Access (E-UTRA); LTE Positioning Protocol A (LPPa) (Release 9)", 3GPP TS 36.455 V9.3.0 (Sep. 2010), 51 pp.
3GPP, Technical Specification: "3rd Generation Partnership Project; Technical Specification Group Radio Access Network; Evolved Universal Terrestrial Radio Access (E-UTRA)and Evolved Universal Terrestrial Radio Access Network (E-UTRAN); Overall description; Stage 2 (Release 8)", 3GPP TS 36.300 V8.2.0 (Sep. 2007), 109 pp.
3GPP, Technical Specification: "3rd Generation Partnership Project; Technical Specification Group Radio Access Network; Evolved Universal Terrestrial Radio Access (E-UTRA); Physical layer; Measurements (Release 9)", 3GPP TS 36.214 V9.2.0 (Jun. 2010), 14 pp.
3GPP, Technical Specification: "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305 V9.4.0 (Sep. 2010), 52 pp.
NGMN Ltd., "NGMN Use Cases related to Self Organising Network, Overall Description", http://www.ngmn.org, May 31, 2007, 18 pp.
Federal Communications Commission (FCC), "FCC 99-245: Third Report and Order—Revision of the Commission's Rules to Ensure Compatibility with Enhanced 911 Emergency Calling Systems", Released: Oct. 6, 1999, 57 pp.
Ericsson, Document for Approval—"pCR to shadow TS 32.422 for MDT, 'Coordination of network based localization with MDS'", 3GPP TSG-SA5 (Telecom Management) Virtual Meeting, S5UEPM0016, date unknown, 5 pp.
European Office Action—Communication pursuant to Article 94(3) EPC, European Application No. 11 860 183.0-1857, Oct. 10, 2014, 5 pages.
International Search Report, Application No. PCT/SE2011/050253, Dec. 7, 2011.
Written Opinion of the International Searching Authority, Application No. PCT/SE2011/050253, Dec. 7, 2011.
Written Opinion of the International Preliminary Examining Authority, Application No. PCT/SE2011/050253, Mar. 11, 2013.
International Preliminary Report on Patentability, Application No. PCT/SE2011/050253, Apr. 12, 2013.
3GPP, Technical Specification: "3rd Generation Partnership Project; Technical Specification Group Radio Access Network; Evolved Universal Terrestrial Radio Access (E-UTRA); LTE Positioning Protocol (LPP) (Release 10)", 3GPP TS 36.355 V10.0.0 (Dec. 2010), 49 pp.
3GPP, Technical Specification: "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)", 3GPP TS 36.305 V10.0.0 (Dec. 2010), 51 pp.
European Search Report, Application No. 11860183.0-1857, Jul. 17, 2014, 3 pages.

* cited by examiner

METHODS AND ARRANGEMENTS FOR HANDLING POSITIONING IN A RADIO COMMUNICATION SYSTEM

CROSS REFERENCE TO RELATED APPLICATION

This application is a 35 U.S.C. §371 national stage application of PCT International Application No. PCT/SE2011/050253, filed on 7 Mar. 2011, the disclosure and content of which is incorporated by reference herein in its entirety. The above-referenced PCT International Application was published in the English language as International Publication No. WO 2012/121633 A1 on 13 Sep. 2012.

TECHNICAL FIELD

Embodiments herein relate to a radio network node and a method in a radio network node. In particular, embodiments herein relate to handling position measurements associated with a user equipment.

BACKGROUND

In a typical cellular radio network, also referred to as a wireless communication system, User Equipments, also referred to as UEs in the figures, communicate via a Radio Access Network (RAN) to one or more core networks (CNs).

A user equipment is a mobile terminal by which a subscriber can access services offered by an operator's core network.

The user equipments are radio network nodes and may be mobile stations or user equipment units such as mobile telephones, also known as "cellular" telephones, and laptops with wireless capability, and thus may be, for example, portable, pocket, hand-held, computer-included, or car-mounted mobile devices which communicate voice and/or data with the radio access network.

Each cell in the cellular radio network covers a geographical area. A cell is served by radio base station equipment at a radio base station. That is, the radio base station provides radio coverage in the cell and communicates over an air interface with user equipment units operating on radio frequencies within its range.

A cell from within which the communication between a user equipment and a base station is communicated, is referred to as the "serving cell" for that user equipment.

A radio base station is a radio network node, in some radio networks called "eNB", "eNodeB", "NodeB" or "B node", and will in this document be referred to as a base station (BS), or a radio network node.

In some versions of the radio access network, several base stations are controlled, e.g. via landlines or radio link, by a Radio Network Controller (RNC) which supervises and coordinates various activities of the plural base stations connected thereto. The radio network controller, which also is a radio network node, is also sometimes termed a Base Station Controller (BSC). The radio network controllers are typically connected to one or more core networks.

In LTE-type radio access networks, there is no separate radio network node corresponding to the BSC or RNC, and the base stations themselves, referred to as eNodeB:s comprise extra functionality.

Due to the size and complexity of many radio communication systems, operators today spend considerable effort in planning, configuring, optimizing, and maintaining their wireless access networks. These efforts can consume a great part of their operational expenditures (OPEX).

Today, operators resort to planning tools to dimension and plan their networks according to a specific business strategy. The approach based on planning tools and prediction is, however, not fully accurate. Reasons for the inaccuracies are imperfections in the used geographic data, simplifications and approximations in the applied propagation models, and changes in the environment, e.g. construction or demolition or seasonal effects such as foliage changes. Furthermore, changes in the traffic distribution and user profiles can lead to inaccurate prediction results. The above mentioned shortcomings force operators to continuously optimize their networks using measurements and statistics, and to perform drive or walk tests.

Drive or walk testing provides a picture of the end user, such as a user equipment, perception in the field, and enables the operator to identify locations causing poor performance and their corresponding cause, e.g. incorrect tilt or handover settings. Drive/walk tests are, however, not ideal since only a limited part of the network can be analyzed due to access restrictions and the cost and time involved. Further, only a snapshot in time of the conditions in the field is captured.

A viable method for overcoming these difficulties is to use the user equipments to report the observed service quality along with the locations where the measurements are performed. These user equipment reports may for example be used by a function which continuously monitors the network and estimates the spatial network performance, e.g. coverage and throughput.

For LTE, three different localization methods are foreseen. The first location function is the network-assisted version of Global Navigation Satellite Systems (GNSSs) like the Global Positioning System (GPS) or Galileo. Different GNSSs can be used individually or in combination with other GNSSs. The network assists the UE GNSS receiver by providing assistance data (e.g., visible satellite list, clock corrections, reference positions) to reduce the UE GNSS start-up and acquisition times, to increase the UE GNSS sensitivity, and to allow the UE to consume less handset power than with stand-alone GNSS. The network-assisted GNSS methods rely on signaling between UE GNSS receivers and a continuously operating GNSS reference receiver network which has clear sky visibility of the same GNSS constellation as the assisted UE.

The second localization method is the Observed Time Difference Of Arrival (OTDOA) method. This method utilizes the differences of time measurements of downlink radio signals from at least three eNodeBs along with the knowledge of the geographical coordinates of the measured eNodeBs and their relative downlink timing for calculating the UE position. The relative eNodeB downlink timing can be determined from information about the relation of each eNodeB downlink timing relative a time reference. One such time reference is the absolute time in the network.

The last localization method, the enhanced cell ID positioning method, uses information about the user equipments, information about the serving cell, and the knowledge of the geographical coordinates of the serving eNodeB for estimating the user equipment position. Additional radio resource measurements like the Reference Signal Received Power (RSRP) or the Reference Signal Received Quality (RSRQ) can be used to improve the user equipment location estimate.

According to one solution user equipment reports include position information in which the user equipments report or log radio measurements (e.g., RSRP), and also provide location info if the latter is available in the user equipment at the time of reporting or logging.

One problem with the above mentioned solution is that the user equipment information is reported by the user equipment only if the position information is known at the time the report is transmitted or measurements logged. This means that the user equipment must have GPS enabled or recently used a positioning service relying on e.g. OTDOA. The UEs will typically have GPS enabled during a limited time or will use GPS frequently but over the same area, e.g., highways.

It may also be desirable to obtain a more accurate position estimate than may be provided by the above methods.

SUMMARY

In view of the discussion above, it is an object for embodiments herein to provide an improved way of positioning in a radio communication system.

According to a first aspect, the object is achieved by a method in a first radio network node for handling position measurements associated with a user equipment. The first radio network node and the user equipment are comprised in a radio communication system. The first radio network node receives from a second radio network node, a position measurement associated with the user equipment, and a system frame number. The system frame number is associated with the second radio network node. The system frame number is further related to a point in time when the position measurement was performed. The first radio network node calculates a position estimate of the position of the user equipment based on the position measurement. The first radio network node defines a time stamp which is based on the received system frame number. The first radio network node then signals to a third radio network node a positioning response. The positioning response comprises the position estimate and the time stamp.

According to a second aspect, the object is achieved by a first radio network node for handling position measurements associated with a user equipment. The first radio network node and the user equipment are comprised in a radio communication system. The first radio network node comprises a receiver configured to receive from a second radio network node, a position measurement associated with the user equipment, and a system frame number. The system frame number is associated with the second radio network node. The system frame number is further related to a point in time when the position measurement was performed. The first radio network node further comprises a calculation unit configured to calculate a position estimate of the position of the user equipment based on the position measurement. The first radio network node further comprises a defining unit configured to define a time stamp, which time stamp is based on the received system frame number. The first radio network node further comprises a signalling unit configured to signal to a third radio network node a positioning response which comprises the position measurement and the time stamp.

According to a third aspect, the object is achieved by a method in a second radio network node for assisting the first radio network node in handling position measurements associated with a user equipment. The first radio network node, the second radio network node and the user equipment are comprised in a radio communication system.

The second radio network node signals to the first radio network node a position measurement associated with the user equipment, and a system frame number. The system frame number is associated with the second radio network node. The system frame number is further related to a point in time when the position measurement was performed. The second radio network node defines a reference time associated with the second radio network node. The reference time relates the system frame number to an absolute time value. The second radio network node either signals the reference time to the first radio network node to enable mapping of the system frame number to an absolute time value which corresponds to the point in time when the positioning measurement was performed, or receives a positioning response from the first radio network node. The positioning response then comprises a position estimate which is based on the position measurement. The positioning response then further comprises a time stamp which is based on the system frame number. The second radio network node then maps the time stamp to an absolute time value based on the reference time. The absolute time value corresponds to the point in time when the position measurement was performed. The second radio network node then further signals to a third radio network node a message comprising the position estimate and the absolute time value.

According to a fourth aspect, the object is achieved by a second radio network node for assisting the first radio network node in handling position measurements associated with a user equipment. The first radio network node, the second radio network node and the user equipment are comprised in a radio communication system. The second radio network node comprises a transmitter configured to transmit to the first radio network node a position measurement associated with the user equipment, and a system frame number. The system frame number is related to a point in time when the position measurement was performed. The second radio network node comprises a defining unit configured to define a reference time associated with the second radio network node. The reference time relates the system frame number to an absolute time value. The transmitter is further configured to signal to the first radio network node the reference time to enable mapping of the system frame number to an absolute time value, which absolute time value corresponds to the point in time when the positioning measurement was performed. Alternatively, the second radio network node further comprises a receiver configured to receive from the first radio network node a positioning response. The positioning response comprises a position estimate which is based on the position measurement. The positioning response further comprises a time stamp which is based on the system frame number. The second radio network node then further comprises a mapping unit configured to map the time stamp to an absolute time value based on the reference time. The absolute time value corresponds to the point in time when the position measurement was performed. The transmitter is then further configured to signal to a third radio network node a message comprising the position estimate and the absolute time value.

Thanks to embodiments herein, by defining a time stamp which is based on the system frame number, accurate time-stamping of a position estimate of a user equipment may be enabled, since the system frame number is related to the actual point in time when the position measurement was performed. Hence, even if it takes some time for the first radio network node to receive the necessary position measurement and calculate the position estimate, the time stamp will correspond to the measurement instant. This may for example improve the possibility for the third radio network node to accurately associate, or correlate, position estimates with radio measurements e.g. for minimization of drive test purposes.

DETAILED DESCRIPTION

Embodiments may be exemplified in the following non-limiting description of embodiments.

As part of the development of embodiments herein, a problem will first be identified and discussed:

In network based positioning methods, the radio network node providing the position may not be the same as the radio network node providing the radio measurements, and even if a radio measurement and a network based positioning for the user equipment are triggered at the same time, the position may not be obtained at the same time as the radio measurements by a receiving entity. This may reduce the number of radio measurements that are associated with an accurate position.

Figure 1:
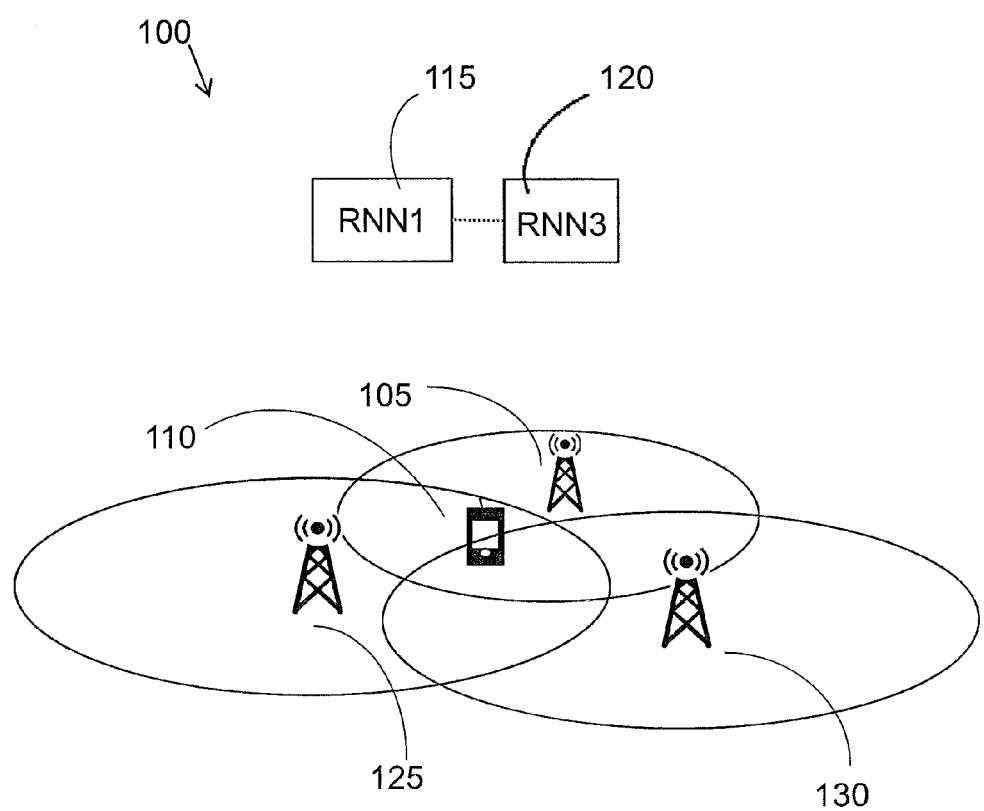
FIG. 1 is a schematic block diagram illustrating an embodiment of a radio communication system.

FIG. 1 depicts a radio communication system 100 in which embodiments herein may be implemented. The radio communication system 100 may be a WCDMA communication system, a GSM communication system, a PDC communication system, a IS95 communication system, a CDMA2000 communication system, a D-AMPS communication system, or any evolved communication system from any aforementioned systems, or another cellular communication system.

The radio communication system 100 comprises radio network nodes whereof one is a base station 105, which in this example is an e-NodeB. The base station 105 provides radio coverage over an area which may be referred to as a "cell". In some embodiments, the base station 105 covers more than one cell.

The base station 105 may in other embodiments be a radio base station such as a Home Node B, a Home eNode B, a GSM/EDGE radio base station or any other network unit capable of serving a user equipment or a machine type communication device in the radio communication system 100.

In the example depicted in FIG. 1, a user equipment 110 is positioned in the cell covered by the base station 105. The user equipment 110 is also a radio network node. The base station 105 is the serving base station for the user equipment 110.

User equipments are radio network nodes, and may be mobile stations or user equipment units such as mobile telephones, also known as "cellular" telephones, and laptops with wireless capability, and thus may be, for example, portable, pocket, hand-held, computer-included, or car-mounted mobile devices which communicate voice and/or data with the radio access network.

When using general terms and when the base station 105 and the user equipment 110 use the same function below, the base station 105 and the user equipment 110 are referred to as the second radio network node 105, 110 and as RNN2 below in FIG. 2. This is since embodiments herein may be implemented in the second radio network node being the base station 105 or the user equipment 110.

The radio communication system 100 further comprises a first Radio Network Node RNN1 115. The first radio network node 115 may be referred to as a positioning server, and comprises functionality for calculating a position estimate of the position of the user equipment 110 by using positioning methods based on for example OTDOA or GNSS as previously described. The position estimate is calculated from position measurements received by the first radio network node 115 from a second radio network node such as the user equipment 110 or the base station 105. The first radio network node 115 may be a logical or physical radio network node. Depending on the radio communication system 100 in question, the first radio network node 115 may be for example a Serving Mobile Location Center (SMLC), or an Evolved Serving Mobile Location Center (E-SMLC).

The radio communication system 100 further comprises a third radio network node RNN3 120. The third radio network node 120 is a receiving entity for the positioning estimates calculated by the first radio network node 115. The third radio network node 120 may for example need a position estimate of, i.e. associated with, the user equipment 110 for positioning of other radio measurements, such as for example the previously discussed minimization of drive tests measurements, which other measurements are also associated with the user equipment 110. The third radio network node 120 may for example be a Trace Collection Entity (TCE), a Mobility Management Entity (MME), or any other suitable radio network node. TCE is a radio network node for collecting measurements and position information related to user equipments. MME is a radio network node for handling mobility related procedures in LTE.

In some radio communication systems 100, the receiving entity for the position estimate is an MME which forwards the positions to a TCE that is the receiving entity for other radio measurements associated with the user equipment 110. It is then the TCE that correlates the position estimates to the other radio measurements, for example for MDT purposes.

The radio communication system 100 further comprises a second base station 125 and a third base station 130. In case of using OTDOA-based positioning, as previously discussed, measurements involving at least three eNodeB:s are needed.

Figure 2:
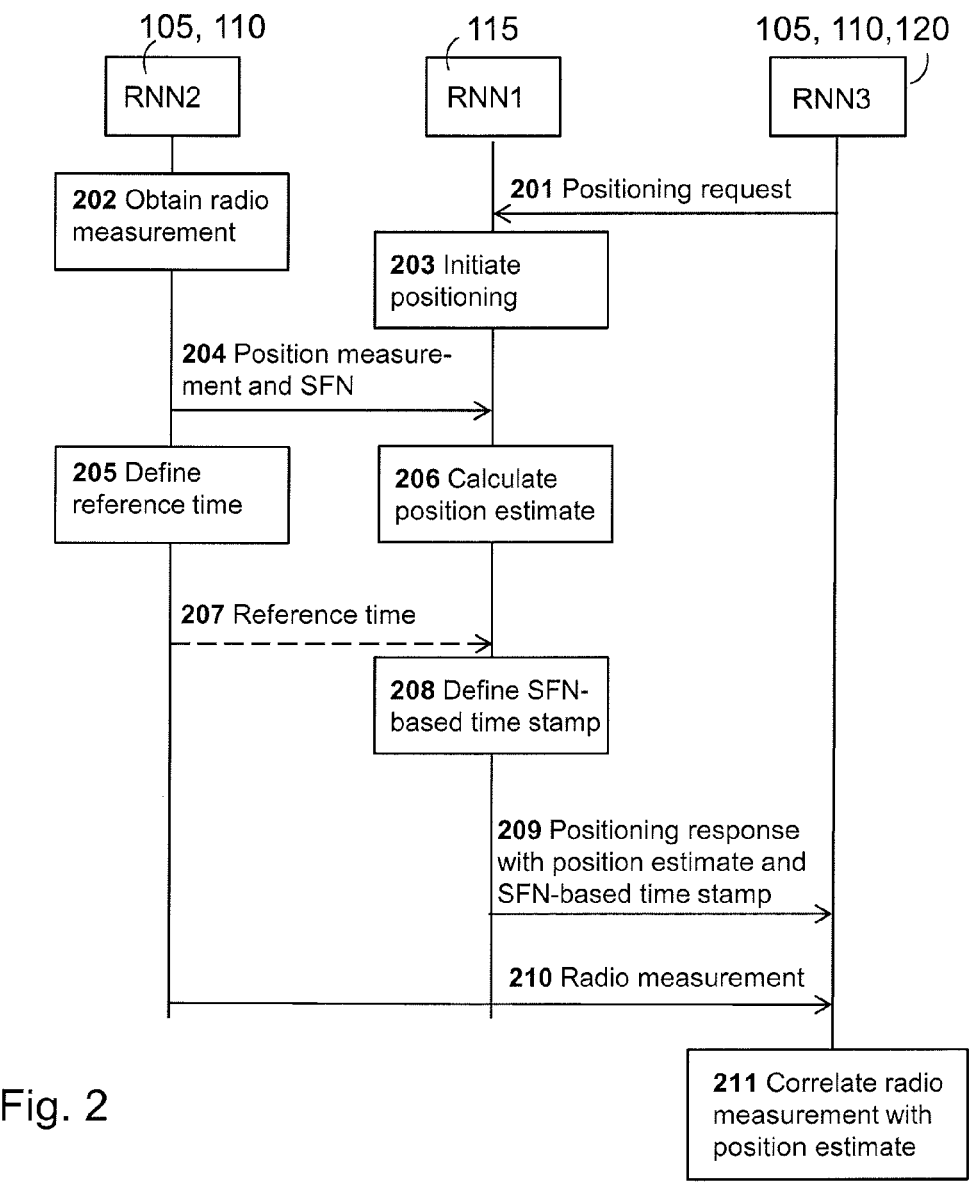
FIG. 2 is a combined signalling scheme and flowchart illustrating embodiments in a radio communication system.

FIG. 2 is a combined flowchart and signalling scheme, illustrating handling of position measurements in the radio communication system 100 according to embodiments herein. It should be noted that the actions which will be referred to may in another embodiment be performed in another suitable order.

In action 201, the first radio network node 115, which in this example is an Evolved Serving Mobile Location Center (E-SMLC), receives a positioning request from the third radio network node 120, which in this example for the sake of simplicity is a TCE which sends a request over an MME.

The second radio network node RNN2 is in this example the base station 105 serving the user equipment 110 referred to in FIG. 1. In another embodiment the second radio network node RNN2 is the user equipment 110 itself. The second radio network node 105, 110 regularly obtains radio measurements, such as for example radio measurements like the previously mentioned performance measurements, performed by the user equipment 110. This is indicated by action 202.

In action 203, the first radio network node 115 initiates network-based positioning of the user equipment 110 as a response to the positioning request received in action 201. In this example, where the first radio network node 115 is an E-SMLC, the first radio network node 115 performs legacy protocol procedures with the base station 110, which in this example is an eNodeB, and/or with the user equipment 110, depending on the type of positioning method employed.

In action 204, the second radio network node 105, 110 signals the in action 202 obtained position measurement associated with the user equipment 110 to the first radio network node 115.

The position measurement is signalled together with a so called System Frame Number (SFN), which is related to the point in time that the position measurement was performed. The system frame number will be described in the following:

The system frame number is a number in a series of consecutive integers, referred to as the system frame numbers, which have the function of a counter in the communication between the base station 105 and the user equipment 110.

System frame numbers have traditionally been used for, for example, guiding user equipments to read cell broadcast information used by the user equipment to gain access to the radio access network, and during handover of user equipments between cells. Some procedures in the radio communication system 100 spans time periods longer than one radio frame. Therefore, each radio frame is associated with a so called system frame number that is repeated in a cyclic manner. For example, in LTE the system frame number is 10 bits, which leads to a system period of 1024, i.e. 1024 different system frame numbers are repeated in a cyclic manner, and in WCDMA it is 12 bits, resulting in a system period of 4096, i.e. 4096 different system frame numbers are repeated in a cyclic manner.

The system frame number which is signalled together with the position measurement is hence in this example an integer between 1 and 1024. The system frame number indicates the time instant that the position measurement was performed. Since the system period in LTE is 10.24 seconds, the resolution when using the system frame numbers as a time scale is 10 ms.

The system period, or the system frame numbers, of different base stations may not be time synchronized to an absolute time which is the same within the whole radio communication system 100.

In action 205, the second radio network node 105, 110 defines a reference time which relates its system frame numbers to absolute time. That is, the reference time indicates the amount of offset that the system frame numbers associated with the base station 105 has, compared to a network wide absolute time, which may be for example the true time.

In action 206, the first radio network node 115 calculates a position estimate based on the position measurement received in action 204. Depending on the method used, this calculation may take some time.

In action 207 the reference time is made available to the first radio network node 115. This may be done by the second radio network node 105, 110 signalling the reference time, or offset, to the first radio network node 115 directly, or indirectly by signalling a signal frame number and a corresponding absolute time value from which the reference time is derivable, i.e. an example SFN-absolute time mapping.

In action 208, the first radio network node 115 defines a time stamp for the position estimate it has calculated.

According to embodiments herein, the time stamp is based on the system frame number received together with the position measurement in action 204. By basing the time stamp on the received system frame number, an accurate time stamp for network based position estimates is achieved, since the system frame number corresponds to the instant that the position measurement was performed.

The time stamp may in some embodiments be the system frame number itself, and in other embodiments the time stamp may be an absolute time value that the system frame number is mapped to. As explained above, knowledge of how to map the system frame number to an absolute time, such as the true time, may be obtained through the reference time which is associated with the second radio network node 105 and which may be made available to the first radio network node 115 according to action 207.

In action 209, the first radio network node 115 signals a positioning response to a receiving entity in the form of the third radio network node RNN3 120. The positioning response comprises the position estimate and the time stamp.

If the time stamp is the system frame number, the reference time may in some embodiments be made available to the third radio network node 120, so that the third radio network node 120 may itself perform the mapping of the system frame number to an absolute time value.

In action 210 the radio measurement, which has previously been mentioned in relation to action 202, is signalled to the third radio network node 120.

In action 211 the radio measurement is correlated to, or associated with, the position estimate, thanks to the provision of the time stamp which enables time—alignment of the radio measurement and the position estimate. For example, by interpolating between position estimates using the time stamp, an estimated position at the time when the radio measurement was taken may be derived.

Hence, thanks to embodiments herein, the number of positioned radio measurements, such e.g. measurements reported in minimization of drive test reports, will increase, since a greater number of positioning methods, e.g., OTDOA may become available for accurate positioning of radio measurements. This gives an improved way of positioning.

It should be noted that, as previously mentioned, the third radio network node 120 may be an MME, a TCE, or another radio network node, or a combination of other radio network nodes.

In some embodiments, the positioning request indicated by action 201 is signalled by an MME, but the positioning response indicated by action 209 may be forwarded from the MME to a TCE. The positioning response may in some embodiments be forwarded in the form of so called "trace records" which is a report comprising several position estimates for the user equipment 110. In such cases the TCE may also be the receiving entity for the radio measurement. The radio measurement may also be obtained in trace record comprising several radio measurements associated with the user equipment 110, in a report from the second radio network node 105, 110. If the TCE is the receiving entity for both the radio measurements and the time-stamped position estimates, it may be the TCE that performs the correlation action 211.

According to some embodiments, the second radio network node 105, 110 is the user equipment 110.

According to some embodiments, the second radio network node 105, 110 and the third radio network node 120 in FIG. 2 are the same radio network node. For example, it may in some embodiments be the user equipment 110 or the base station 105 that performs all the actions for the second radio network node 105, 110 and the third radio network node 120 in FIG. 2. This may be the case for example if the first radio network node, the E-SMLC in this example, defines the time stamp as the system frame number, and sends the positioning response to the user equipment 110 or the base station 105, so that the user equipment 110 or the base station 105 may itself perform the mapping of the system frame number to an absolute time value. In such embodiments, the user equipment 110 or the base station 105 may signal the position estimate and the absolute time value to an MME, to an E-SMLC, or a TCE. The user equipment 110 or the base station 105 may also in such embodiments correlate the radio measurement and the position estimate, and forward the correlated estimate and the radio measurement to a receiving entity such as a MME or a TCE.

Figure 3:
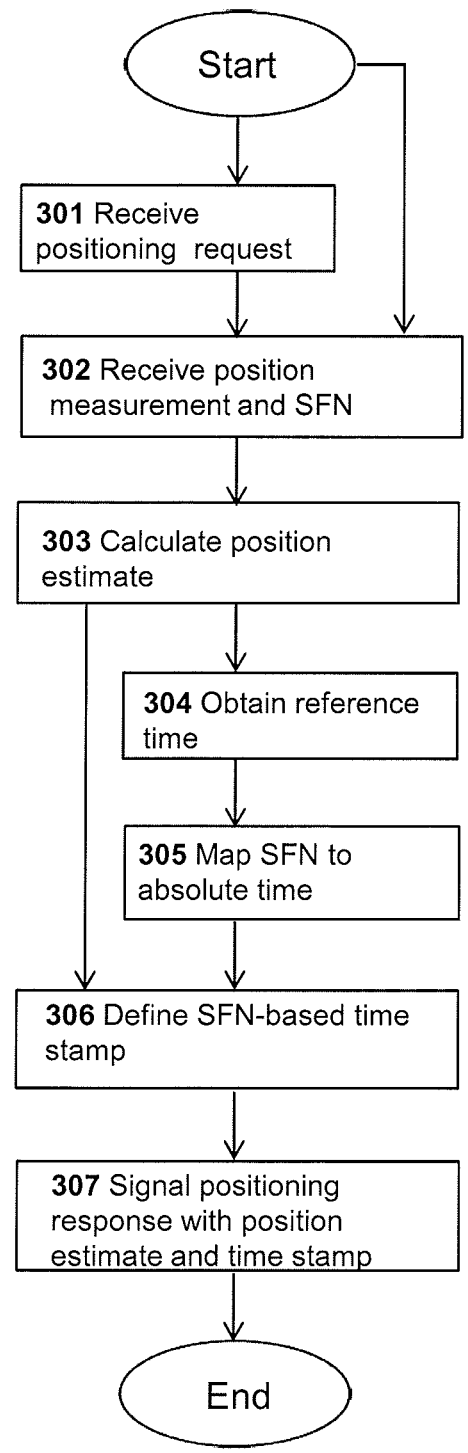
FIG. 3 is a flowchart depicting embodiments of a method in a first radio network node.

Embodiments herein, relating to a method in the first radio network node 115 for handling position measurements associated with the user equipment 110, will now be described with reference to the flowchart depicted in FIG. 3. As previously mentioned, the first radio network node 115 and the user equipment 110 are comprised in the radio communication system 100. The first radio network node may be an E-SMLC, a SMLC, or another positioning server. The first radio network node may be a functional or a physical radio network node. The method comprises the following actions, which actions may be performed in any suitable order:

Action 301

This is an optional action according to which the first radio network node 115 receives a positioning request from the second radio network node 105, 110 or a third radio network node 105, 110, 120. The positioning request requests positioning of the user equipment 110.

The second radio network node may be the user equipment 110 or the base station 105 serving the user equipment 110. The third radio network node may be a MME, or a TCE or another suitable radio network node which is involved in handling positioning of user equipments for example for minimisation of drive tests purposes. In some embodiments, the third radio network node is the user equipment 110 or the base station 105.

Action 302

The first radio network node 115 receives from the second radio network node 105, 110 a position measurement associated with the user equipment 110, and a system frame number. As previously mentioned, the second radio network node 105, 110 may the user equipment 110 or the serving base station 105 for the user equipment 110. The system frame number is associated with the second radio network node 105, 110.

By "associated with" is understood that it is the system frame number used by the second radio network node 105 and the user equipment 110 it is serving. The system frame number is further related to a point in time when the position measurement was performed.

Action 303

The first radio network node 115 calculates a position estimate of the position of the user equipment 110 based on the position measurement. In some embodiments, more than one position measurement is received in action 302, and the more than one position measurements are used for calculating the position estimate.

Action 304

This is an optional action according to which the first radio network node 115 obtains a reference time associated with the second radio network node 105, 110. The reference time relates the system frame number to an absolute time value.

According to some embodiments, obtaining the reference time comprises receiving a second system frame number and a corresponding second absolute time value associated with the second radio network node 105, 110. The reference time may then be derived from the second system frame number and the corresponding second absolute time value.

Action 305

This is also an optional action according to which the first radio network node 115 maps the in action 304 received system frame number to an absolute time value based on the reference time. The absolute time value corresponds to the point in time when the position measurement was performed.

Action 306

The first radio network node 115 defines a time stamp, which time stamp is based on the received system frame number.

According to some embodiments the time stamp is defined as the obtained system frame number.

According to other embodiments, wherein the action 305 has been performed, the time stamp may be defined as an absolute time value.

Action 307

The first radio network node 115 signals to the third radio network node 105, 110, 120 a positioning response. The third radio network node may be the user equipment 110, the base station 105 serving the user equipment 110, or another radio network node such as an MME or a TCE. The positioning response comprises the position estimate and the time stamp.

The third radio network node 105, 110, 120 may use the time stamp to correlate the position estimate to another radio measurement associated with the user equipment 110, for example to compute maps showing spatial performance information, such as showing RSRP over a geographical area.

Figure 4:
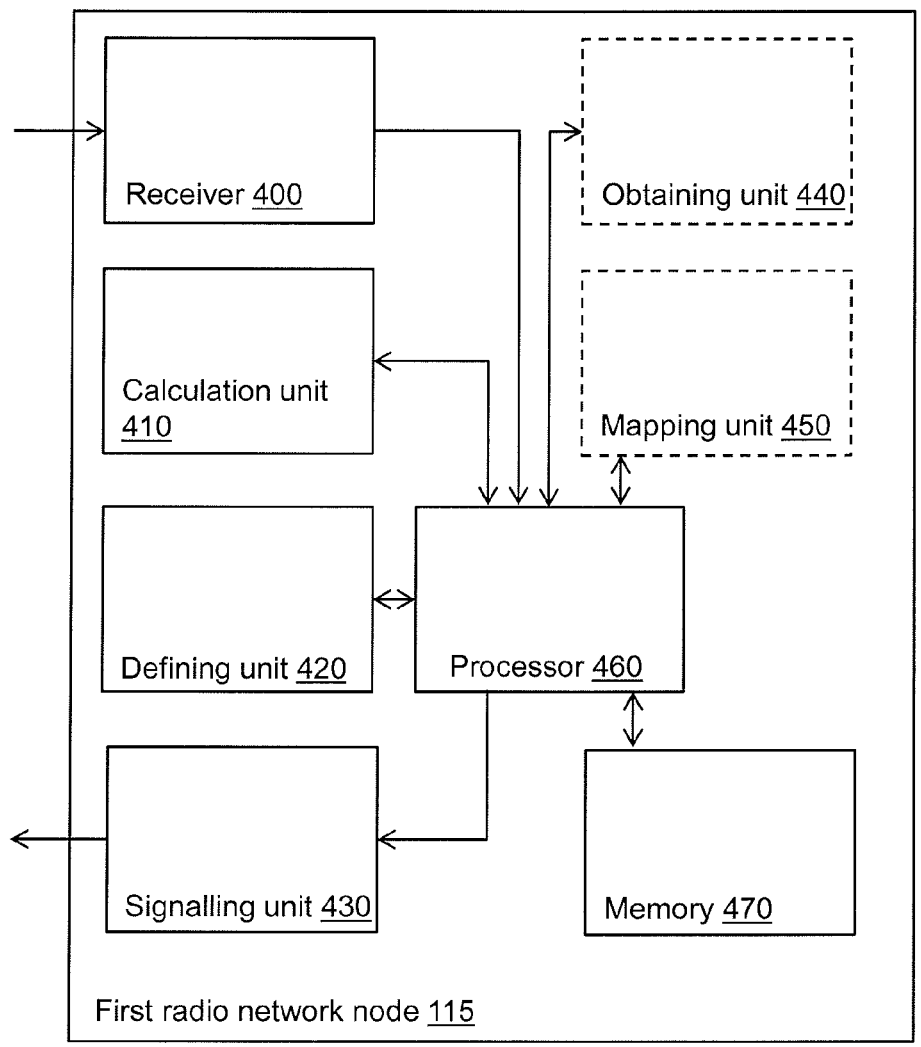
FIG. 4 is a schematic block diagram illustrating embodiments of a first radio network node.

To perform the actions above for handling position measurements associated with the user equipment 110, the first radio network node 115 comprises an arrangement schematically depicted in FIG. 4. As mentioned above, the first radio network node 115 is comprised in a radio communication system 100. The term "configured to" used herein may also be referred to as "arranged to".

The first radio network node 115 comprises a receiver 400 configured to receive from a second radio network node 105, 110 a position measurement associated with the user equipment 110, and a system frame number. The system frame number is associated with the second radio network node 105, 110, and the system frame number is related to a point in time when the position measurement was performed.

In some embodiments, the receiver 400 is further configured to receive a second system frame number and a corresponding second absolute time value associated with the second radio network node 105, 110.

In some embodiments, the receiver 400 is further configured to receive from any one of the second radio network node 105, 110 or a third radio network node 120 a positioning request, which positioning request requests positioning of the user equipment 110.

The first radio network node 115 further comprises a calculation unit 410 configured to calculate a position estimate of the position of the user equipment based on the position measurement.

The first radio network node 115 further comprises a defining unit 420 configured to define a time stamp, which time stamp is based on the received system frame number.

In some embodiments, the defining unit 420 is configured to define the time stamp as an absolute time value based on a reference time which reference time relates the system frame number to the absolute time value.

In some embodiments, the defining unit 420 is configured to define the time stamp as the obtained system frame number.

The first radio network node further comprises a signalling unit 430 configured to signal to a third radio network node 105, 110, 120 a positioning response, which positioning response comprises the position measurement and the time stamp.

In some embodiments, the first radio network node 115 further comprises an obtaining unit 440 configured to obtain a reference time associated with the second radio network node 105, 110, which reference time relates the system frame number to an absolute time value, which absolute time value corresponds to the point in time when the position measurement was performed. In some embodiments, the obtaining unit 440 is configured to derive the reference time from a second system frame number and a corresponding second absolute time value associated with the second radio network node 105, 110. In such embodiments, the first radio network node may further comprise a mapping unit 450 configured to map the obtained system frame number to an absolute time value based on the reference time.

Figure 6:
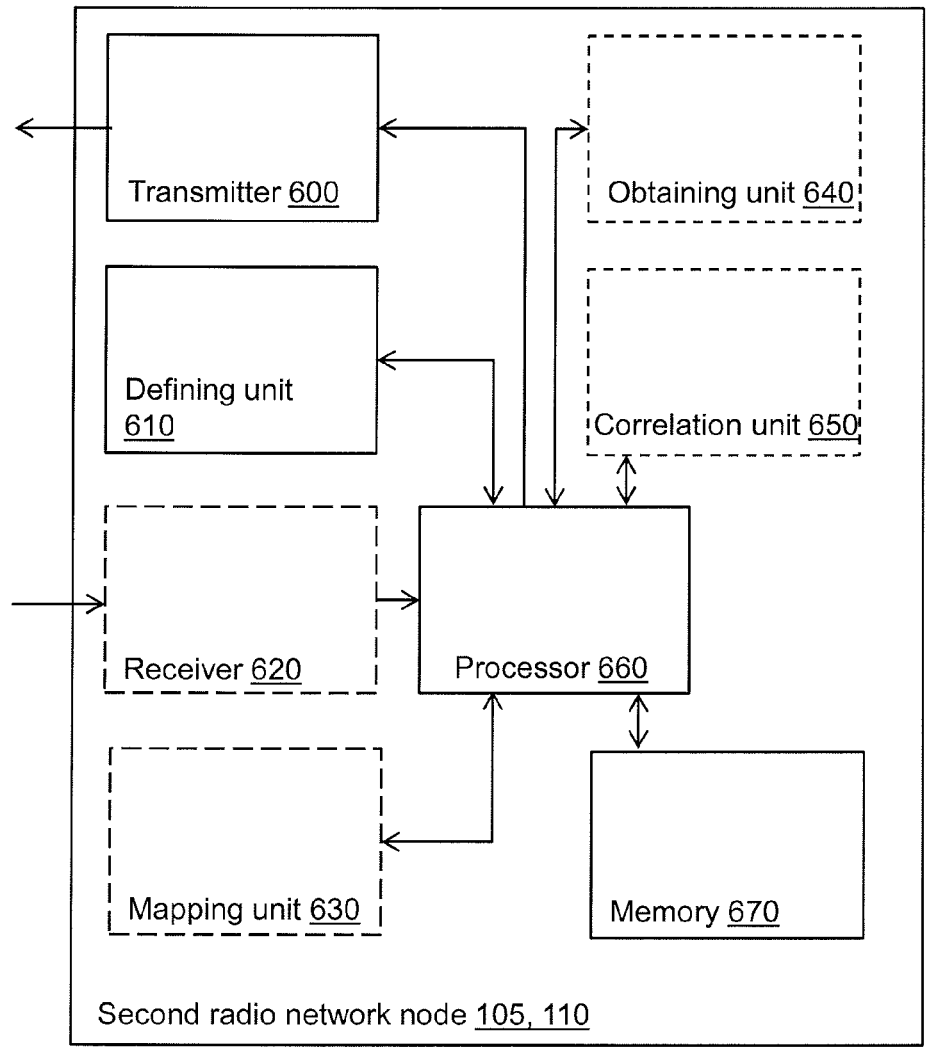
FIG. 6 is a schematic block diagram illustrating embodiments of a second radio network node.

The embodiments of the first radio network node 115 for handling position measurements associated with the user equipment 110 may be implemented through one or more processors, such as a processor 460 in the first radio network node 115 depicted in FIG. 6, together with computer program code for performing the actions of embodiments herein.

The program code mentioned above may also be provided as a computer program product, for instance in the form of a data carrier carrying computer program code for performing the embodiments herein when being loaded into the first radio network node 105, 110.

One such carrier may be in the form of a CD ROM disc. It is however feasible with other data carriers such as a memory stick. The computer program code may furthermore be provided as pure program code on a server and downloaded to the first radio network node 115 e.g. remotely.

The first radio network node 115 may further comprise a memory 470 comprising one or more memory units. The memory 470 is arranged to be used to store data such as for example position measurements, the system frame number, the reference time, the time stamp and/or the position estimate. It may further be arranged to store applications to perform the actions of the embodiments herein when being executed in the first radio network node 115.

Figure 5:
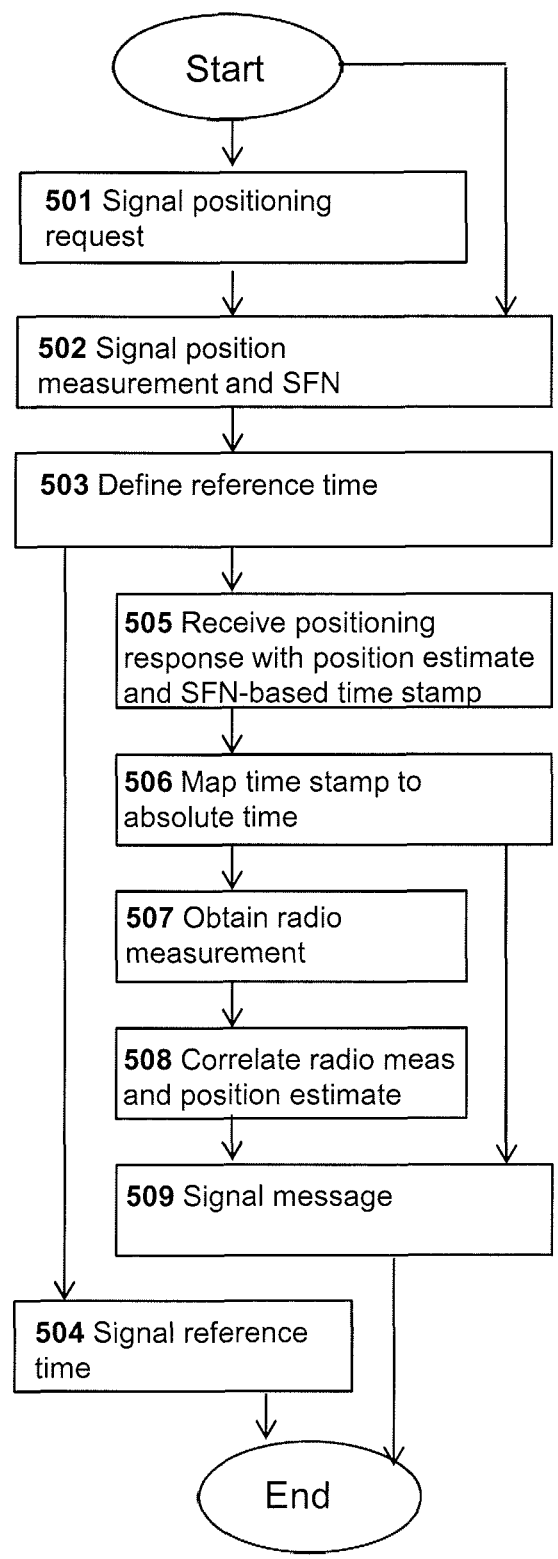
FIG. 5 is a flowchart depicting embodiments of a method in a second radio network node.

Embodiments herein, relating to a method in a second radio network node 105, 110 for assisting the first radio network node 115 in handling position measurements associated with a user equipment 110 will now be described with reference to the flowchart depicted in FIG. 5. As previously mentioned, the first radio network node 115, the second radio network node 105, 110 and the user equipment 110 are comprised in a radio communication system 100. The second radio network node may be the user equipment 110 or the base station 105 serving the user equipment 110, or any other suitable radio network node.

The method comprises the following actions, which actions may be performed in any suitable order:

Action 501

This is an optional action according to which the second radio network node 105, 110 may signal to the first radio network node 115 a positioning request, requesting positioning of the user equipment 110.

Action 502

The second radio network node 105, 110 signals to the first radio network node 115, a position measurement associated with the user equipment 110, and a system frame number, which system frame number is associated with the second radio network node 105, 110, and which system frame number is related to a point in time when the position measurement was performed.

Action 503

The second radio network node 105, 110 defines a reference time. The reference time is associated with the second radio network node 105, 110, and the reference time relates the system frame number to an absolute time value.

In the following, two alternative courses of actions will be described. According to embodiments herein, either action 504 or actions 505-509, of which actions 507 and 508 are optional, are performed.

Action 504

The second radio network node 105, 110 signals to the first radio network node 115 the reference time to enable mapping of the system frame number to an absolute time value, which absolute time value corresponds to the point in time when the positioning measurement was performed.

This way, the first radio network node may map the system frame number to an absolute time value and use the absolute time value as the time stamp for a position estimate calculated by the first radio network node based on the position measurement. Such a time stamp may facilitate correlation of the position estimate to other radio measurements associated with the user equipment 110.

For example, by interpolating between position estimates of the user equipment 110 using the time stamp, an estimate may be derived of the position that the user equipment 110 had at the time when a certain radio measurement associated with the user equipment 110 was performed.

Action 505

The second radio network node 105, 110 receives from the first radio network node 115 a positioning response comprising a position estimate which is based on the position measurement, and a time stamp which is based on the system frame number.

Action 506

The second radio network node 105, 110 maps the time stamp to an absolute time value based on the reference time, which absolute time value corresponds to the point in time when the position measurement was performed.

Action 507

This is an optional action according to which the second radio network node 105, 110 obtains a radio measurement associated with the user equipment 110.

Action 508

If action 507 is performed, then this action 508 may also be performed, wherein the second radio network node 105, 110 correlates, based on the mapping 506, the radio measurement obtained in action 507 to the position estimate.

Action 509

The second radio network node 105, 110 signals to a third radio network node 120 a message comprising the position estimate and the absolute time value. If optional actions 508 and 509 are performed, the message further comprises the radio measurement, which has been correlated to the position estimate. The third radio network node may be for example a MME or a TCE.

To perform the actions above for assisting the first radio network node 115 in handling position measurements associated with the user equipment 110, the second radio network node 105, 110 comprises an arrangement schematically depicted in FIG. 6. As mentioned above, the first radio network node 115, the second radio network node 105, 110, and the user equipment 110 are comprised in a communication system 100. The second radio network node 105, 110 may be the user equipment 110 or a base station 105 serving the user equipment 110. The term "configured to" used herein may also be referred to as "arranged to".

The second radio network node 105, 110 comprises a transmitter 600 configured to transmit to the first radio network node 115 a position measurement associated with the user equipment 110, and a system frame number which is related to a point in time when the position measurement was performed.

In some embodiments, the transmitter 600 is further configured to signal to the first radio network node 115 a reference time to enable mapping of the system frame number to an absolute time value, which absolute time value corresponds to the point in time when the positioning measurement was performed.

In some embodiments, the transmitter 600 is further configured to signal to a third radio network node 120 a message comprising the position estimate and the absolute time value.

In some embodiments, the transmitter 600 is further configured to signal to the first radio network node 115 a positioning request, requesting positioning of the user equipment 110.

The second radio network node further comprises a defining unit 610 configured to define the reference time associated with the second radio network node 105, 110, which reference time relates the system frame number to an absolute time value.

In some embodiments, the second radio network node 105, 110 further comprises a receiver 620 configured to receive from the first radio network node 115 a positioning response comprising a position estimate based on the position measurement and a time stamp based on the system frame number, and a mapping unit 630 configured to map the time stamp to an absolute time value based on the reference time, which absolute time value corresponds to the point in time when the position measurement was performed.

In some embodiments, the second radio network node may further comprise an obtaining unit 640 configured to obtain a radio measurement associated with the user equipment 110, and a correlation unit 650 configured to correlate, based on the mapping, the radio measurement to the position estimate. In such embodiments, the message may further comprise the radio measurement.

The embodiments of the second radio network node 105, 110 for assisting the first radio network node 115 in handling position measurements associated with the user equipment 110 may be implemented through one or more processors, such as a processor 660 in the second radio network node 105, 110 depicted in FIG. 6, together with computer program code for performing the actions of embodiments herein.

The program code mentioned above may also be provided as a computer program product, for instance in the form of a data carrier carrying computer program code for performing the embodiments herein when being loaded into the second radio network node 105, 110.

One such carrier may be in the form of a CD ROM disc. It is however feasible with other data carriers such as a memory stick. The computer program code may furthermore be provided as pure program code on a server and downloaded to the second radio network node 105, 110 e.g. remotely.

The second radio network node 105, 110 may further comprise a memory 670 comprising one or more memory units. The memory 670 may be arranged to be used to store data such as for example the reference time, the system frame number, the position measurement and/or the radio measurement. It may further be arranged to store applications to perform the actions of the embodiments herein when being executed in the second radio network node 105, 110.

Since embodiments herein provide accurate time-stamping of position estimates associated with a user equipment, embodiments herein facilitate and/or improve the time alignment of position estimates to other radio measurements associated with the user equipment. Hence, embodiments herein enable an improved minimization of drive test framework. This way, the dataset used for producing maps may be increased.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be performed as limiting the scope of the invention, which is defined by the appending claims.

The invention claimed is:

1. A method in a first radio network node for handling position measurements associated with a user equipment, which first radio network node and which user equipment are comprised in a radio communication system, the method comprising:
   receiving from a second radio network node a position measurement associated with the user equipment, and a system frame number, which system frame number is associated with the second radio network node, and which system frame number is related to a point in time when the position measurement was performed,
   calculating a position estimate of the position of the user equipment based on the position measurement,
   obtaining a reference time associated with the second radio network node, which reference time relates the system frame number to an absolute time value,
   mapping the received system frame number to the absolute time value based on the reference time, wherein the absolute time value corresponds to the point in time when the position measurement was performed,
   defining a time stamp, which time stamp is based on the received system frame number and wherein the time stamp is defined as the absolute time value, and
   signalling, to a third radio network node a positioning response, which positioning response comprises the position estimate and the time stamp.

2. The method according to claim 1, wherein the time stamp is defined as the received system frame number.

3. The method according to claim 1, wherein obtaining the reference time comprises receiving a second system frame number and a corresponding second absolute time value associated with the second radio network node, and wherein the reference time is derived from the second system frame number and the corresponding second absolute time value.

4. The method according to claim 1, further comprising:
   receiving from any one of the second radio network node or the third radio network node, a positioning request, which positioning request requests positioning of the user equipment.

5. A first radio network node for handling position measurements associated with a user equipment, which first radio network node and which user equipment are comprised in a radio communication system, the first radio network node comprising:
   a receiver configured to receive from a second radio network node a position measurement associated with the user equipment, and a system frame number, which system frame number is associated with the second radio network node, and which system frame number is related to a point in time when the position measurement was performed,
   one or more processors configured to:
      calculate a position estimate of the position of the user equipment based on the position measurement, obtain a reference time associated with the second radio network node, which reference time relates the system frame number to an absolute time value, map the received system frame number to the absolute time value based on the reference time, wherein the absolute time value corresponds to the point in time when the position measurement was performed, define a time stamp, which time stamp is based on the received system frame number, wherein the time stamp is defined as the absolute time value, and signal to a third radio network node a positioning response, which positioning response comprises the position measurement and the time stamp.

6. The first radio network node according to claim 5, wherein the time stamp is defined as the received system frame number.

7. The first radio network node according to claim 5, wherein the receiver is further configured to receive a second system frame number and a corresponding second absolute time value associated with the second radio network node, and wherein the obtaining unit is configured to derive the reference time from the second system frame number and the corresponding second absolute time value.

8. The first radio network node according to claim 5, wherein the receiver is further configured to receive from any one of the second radio network node or the third radio network node, a positioning request, which positioning request requests positioning of the user equipment.

9. A method in a second radio network node for assisting a first radio network node in handling positioning measurements associated with a user equipment, which first radio network node, which second radio network node and which user equipment are comprised in a radio communication system, the method comprising:

signalling to the first radio network node, a position measurement associated with the user equipment, and a system frame number, which system frame number is associated to the second radio network node, and which system frame number is related to a point in time when the position measurement was performed, defining a reference time associated with the second radio network node, which reference time relates the system frame number to an absolute time value, signalling to the first radio network node the reference time to enable mapping of the system frame number to an absolute time value, which absolute time value corresponds to the point in time when the positioning measurement was performed, or receiving from the first radio network node a positioning response comprising a position estimate based on the position measurement, and a time stamp based on the system frame number, and mapping the time stamp to an absolute time value based on the reference time, wherein the absolute time value corresponds to the point in time when the position measurement was performed, and signalling to a third radio network node a message comprising the position estimate and the absolute time value.

10. The method according to claim 9, further comprising:
obtaining a radio measurement associated with the user equipment, and
correlating the radio measurement to the position estimate based on the mapping, and wherein the message further comprises the radio measurement.

11. The method according to claim 9, further comprising signalling to the first radio network node a positioning request, requesting positioning of the user equipment.

12. A second radio network node for assisting a first radio network node in handling positioning measurements associated with a user equipment, which first radio network node, which second radio network node and which user equipment are comprised in a radio communication system, the second radio network node comprising:

a transmitter configured to transmit to the first radio network node, a position measurement associated with the user equipment, and a system frame number, which system frame number is related to a point in time when the position measurement was performed, a processor configured to define a reference time associated with the second radio network node, which reference time relates the system frame number to an absolute time value, wherein the transmitter is further configured to signal to the first radio network node the reference time to enable mapping of the system frame number to the absolute time value, wherein the absolute time value corresponds to the point in time when the positioning measurement was performed, or wherein the second radio network node further comprises a receiver configured to receive from the first radio network node a positioning response comprising a position estimate based on the position measurement and a time stamp based on the system frame number, and the processor configured to map the time stamp to a second absolute time value based on the reference time, wherein the second absolute time value corresponds to the point in time when the position measurement was performed, and wherein the transmitter is further configured to signal to a third radio network node a message comprising the position estimate and the absolute time value or the second absolute time value.

13. The second radio network node according to claim 12, wherein the processor is further configured to:
obtain a radio measurement associated with the user equipment, and
correlate, based on the mapping, the radio measurement to the position estimate, and wherein the message further comprises the radio measurement.

14. The second radio network node according to claim 12, wherein the transmitter is further configured to signal to the first radio network node a positioning request, requesting positioning of the user equipment.

\* \* \* \* \*